United States Patent [19]

Boeckeler et al.

[11] Patent Number: 5,369,139
[45] Date of Patent: Nov. 29, 1994

[54] RADIATION AND PEROXIDE CURABLE EMULSIFIED COATINGS

[75] Inventors: Rudolph H. Boeckeler, Grafton; Delano R. Eslinger, West Bend, both of Wis.

[73] Assignee: Cook Composites and Polymers Company, Port Washington, Wis.

[21] Appl. No.: 107,521

[22] Filed: Aug. 17, 1993

[51] Int. Cl.$^5$ .............. C08F 2/46; C08F 4/42; C08F 16/12
[52] U.S. Cl. .................. 522/21; 522/100; 522/104; 522/114; 523/406; 523/501; 523/526; 524/507; 524/517; 524/558; 526/230; 526/232.1; 526/333; 526/109
[58] Field of Search ............ 522/21, 24, 100, 104, 522/114, 129; 523/406, 505, 526, 501; 526/333, 227, 230, 232.1, 90, 93, 109; 524/399, 558, 507, 517

[56] References Cited

U.S. PATENT DOCUMENTS

| | | | |
|---|---|---|---|
| 4,587,290 | 5/1986 | Davies et al. | 526/229 |
| 4,778,864 | 10/1988 | Hardiman | 526/332 |
| 5,075,384 | 12/1991 | DuPont et al. | 525/293 |
| 5,095,069 | 3/1992 | Ambrose et al. | 524/591 |
| 5,162,475 | 11/1992 | Tang et al. | 526/333 |

OTHER PUBLICATIONS

Davis, et al., The Synthesis and Properties of a Novel Series of Water Soluble Thioxanthone Photoinitiators, 1986, pp. 9–12, Chemspec '86 BACS Symposium.
Philips, et al., Radiationcurable Water Dilutable Polyesteracrylates, pp. 157–161, Drogenbos, Belgium.
Allen, et al., Photochemistry of Novel Water-Soluble Parasubstituted Benzophenone Photoinitiators: A Photocalorimetric and Photoreduction Study, 1988, pp. 171–177, Journal of Photochemistry and Photobiology.
P-CURE Resins for Peroxide-Curable Coatings, Cook Composite and Polymers, Freeman Polymer Division.
Beck, et al., Radiation Curing and Water, Mar. 1992, Farbe+Lack.

*Primary Examiner*—Tae H. Yoon
*Attorney, Agent, or Firm*—Whyte Hirschboeck Dudek

[57] ABSTRACT

Radiation and peroxide-curable oligomeric emulsions are prepared by mixing water, an $\alpha,\beta$-ethylenically unsaturated oligomer (e.g. an unsaturated polyester), a reactive, nonionic surfactant containing allyl unsaturation, and a metallic salt drier under high shear agitation until a stable emulsion is formed. Coatings prepared from these emulsions are tack and mar free and demonstrate good resistance to organic solvents and water.

16 Claims, No Drawings

RADIATION AND PEROXIDE CURABLE EMULSIFIED COATINGS

BACKGROUND OF THE INVENTION

This invention relates to coating systems. In one aspect, the invention relates to coating systems based on $\alpha,\beta$-ethylenically unsaturated oligomers while in another aspect, the invention relates to such systems in an emulsified form. In yet another aspect, the invention relates to such emulsified systems comprising a nonionic surfactant containing allyl unsaturation.

The increasing demands for coating systems with reduced volatile organic compounds (VOC) have brought radiation and peroxide curable coatings to the forefront. These systems can be formulated with little, if any, solvent, and they cure rapidly to form highly crosslinked polymeric structures.

The resins commonly used in radiation and peroxide curable coatings are low to medium molecular weight unsaturated polyesters, and acrylate and methacrylate esters of polyethers, polyesters, epoxies and polyurethanes. In order to render these relatively viscous oligomers suitable for application by conventional coatings techniques, they are diluted in low viscosity reactive monomers such as trimethylolpropane triacrylate, 1,6-hexanedioldiacrylate, N-vinyl-2-pyrrolidone, tetraethyleneglycol diacrylate, ethyleneglycol dimethacrylate, styrene, and the like.

Peroxide and radiation curable coatings suitable for roll coater or spray application usually contain 30–60 percent by weight of such reactive diluent monomers to achieve sufficiently low viscosities for application of a smooth film. However, since monomer-diluted coatings undergo, relative to solvent-diluted coatings, little volume reduction through evaporation, it is difficult to achieve very thin films with conventional application equipment, e.g. films with a thickness of less than about 0.5 mil.

Such large amounts of reactive monomer generally result in a reduction in a cure rate, decrease in physical properties of the cured film, unpleasant odor, and an increase in toxicity of the coating.

Many of the most effective monomers for reducing viscosity and maintaining good film integrity have the highest levels of toxicity. Higher molecular weight monomers with higher reactive group content have less effect on rate of cure and film properties, but do little for reducing viscosity.

The replacement of reactive monomer with water offers a route to lower viscosity, reduced odor, rapid cure and better film properties.

Water-soluble oligomers containing hydrophilic groups such as polyethylene glycol or neutralized acidic groups achieve some of the above-mentioned goals, but are inherently water sensitive in the cured film.

Conventional radiation or peroxide curable emulsions or dispersions are prepared with anionic, cationic or nonionic surfactants. These surfactants are nonreactive, nonvolatile components which lead to a reduced cure response, softer films and less resistance to water and organic solvents. In highly crosslinked films these surfactants tend to bleed out or "surface scum" during cure of the oligomer or upon aging.

SUMMARY OF THE INVENTION

These and other disadvantages of the prior art water-based radiation and peroxide curable coating systems are moderated, if not eliminated, by using a reactive nonionic surfactant in combination with an auto-oxidative curing mechanism.

The radiation and peroxide curable oligomeric emulsions of this invention are prepared by adding water under high shear agitation to a mixture comprising:
  A. an $\alpha,\beta$-ethylenically unsaturated oligomer;
  B. a reactive, nonionic surfactant containing allyl unsaturation; and
  C. a metallic salt drier.

The emulsions of this invention demonstrate good shelf life, cure response, and cure to produce hard films with good resistance to organic solvents and water.

DESCRIPTION OF THE PREFERRED EMBODIMENTS

Illustrative $\alpha,\beta$-ethylenically unsaturated oligomers which can be used in the practice of this invention include:
  Unsaturated Polyesters,
  Urethane Acrylates,
  Urethane Methacrylates,
  Epoxy Acrylates,
  Epoxy Methacrylates,
  Polyester Acrylates,
  Polyester Methacrylates,
  Polyether Acrylates, and
  Polyether Methacrylates.

Epoxy acrylates and methacrylates include the reaction products of diepoxides with acrylic or methacrylic acid, for example the reaction product of methacrylic or acrylic acid with the diglycidyl ether of bisphenol A. Urethane acrylates and methacrylates include the reaction products of hydroxy alkyl acrylates and methacrylates with organic isocyanates, for example, the reaction product of isophorone diisocyanate with hydroxy ethyl methacrylate. Other urethane acrylates include the reaction products prepared by combining an organic diisocyanate, hydroxy alkyl acrylate or methacrylate with a polyol such as propylene glycol, a glycol diester, or a polycaprolactone diol or triol. Unsaturated polyesters include the reaction productions of $\alpha,\beta$-unsaturated dicarboxylic acids or anhydrides having $\alpha,\beta$-unsaturation and a polyhydric alcohol, for example the reaction product of maleic anhydride with propylene glycol. Polyester acrylates and methacrylates include the reaction products of saturated polyester polyols with acrylic or methacrylic acid, for example the reaction product of esters of adipic acid and neopentyl glycol with acrylic acid. Polyether acrylates and methacrylates include the reaction products of glycol ethers and acrylic or methacrylic acid, for example the reaction product of dipentaerythritol and acrylic acid. The unsaturated oligomers manufactured and sold by the Polymer Division of Cook Composites and Polymers Co. under the trademark P-CURE ® are both exemplary and preferred.

The unsaturated oligomers used in the practice of this invention are selected for optimum properties in the final product. For outdoor weather resistant or abrasion resistant characteristics, urethane acrylate and methacrylate resins based on aliphatic isocyanates are preferred. For chemical resistance, epoxy acrylates and methacrylates are preferred.

The nonionic surfactant consists of hydrophilic groups, hydrophobic groups, and allylic groups. Illustrative surfactants of this nature are the products of PPG Industries, Inc., and these surfactants are described in U.S. Pat. No. 5,162,475 which is incorporated herein by reference.

These surfactants are represented by the following graphic formula:

wherein

R is an organic monovalent radical having $\alpha,\beta$-olefinic (ethylenic) unsaturation, i.e., terminal ethylenic unsaturation such as an organic radical selected from the group consisting of $\alpha,\beta$-unsaturated $C_2$–$C_{18}$ alkenyl, e.g., vinyl and allyl, acrylyl, acrylyl ($C_1$–$C_{10}$) alkyl, methacrylyl, methacrylyl ($C_1$–$C_{10}$) alkyl, vinylphenyl and vinylphenylene ($C_1$–$C_6$) alkyl;

R'O is a bivalent alkylene-oxy (substituted and unsubstituted) group derived from a cyclic ether other than ethylene oxide or mixture of such cyclic ethers;

E is a bivalent ethylene radical;

X is selected from the group consisting of hydroxyl (—OH), chloride (—Cl), sulfonate (—SO$_3$), sulfate (—OSO$_3$), phosphate [—O—P(O)—(OH)$_2$], diphosphate [—O—P(O)(OH)$_2$]$_2$, acetate (—CH$_2$—C(O) OH), isethionate (—CH$_2$—CH$_2$—SO$_3$H), and the alkali metal salts of the aforedescribed sulfonate, sulfate, phosphate, acetate and isethionate anionic groups and tertiary amino; and m and n are each numbers which may vary from about 5 to about 100, preferably between about 5 or 10 and about 50.

The substituants of this formula are further described in U.S. Pat. No. 5,162,475.

The allyl containing surfactant is present in the coating composition in an amount ranging from about 0.5 to about 15% based on the total weight of organic components, preferably in the range of about 3 to about 8 percent.

Any metallic salt drier that will promote or accelerate the rate of cure of the allylic functional surfactant, $\alpha,\beta$-ethylenically unsaturated oligomer, and crosslinker-initiator (if present) can be used in the practice of this invention. Typical of these driers are salts of metals with a valence of two or more and saturated or unsaturated organic acids. Representative metals include cobalt, copper, manganese, lead, zinc, vanadium, cerium and nickel. Representative acids include octoates, napthenates, and neodecanoates. Preferred metallic salt driers are cobalt and manganese driers such as cobalt octoate, cobalt napthenate, manganese octoate and manganese napthenate.

The amount of metallic drier in the emulsifiable composition can vary, but this amount, based on the weight percent of metal in the drier (usually between about 4 and about 15 percent), typically is in excess of about 0.005 weight percent, preferably in excess of about 0.01 percent and more preferably in excess of about 0.03 percent. Typically, this amount is not in excess of about 0.08 percent and preferably not in excess of about 0.05 percent.

The amount of water used in the emulsion can vary from about 10 percent to about 90 percent by weight of the total emulsified composition. Preferably, water is present in an amount of at least about 20 percent by weight and not in excess of about 60 percent by weight. More preferably, water is present in an amount between about 30 percent and about 50 percent by weight. The less water which is present, the more quickly it can be removed from the deposited film.

While ordinary tap water is usually suitable for making the emulsion, it is desirable to avoid water of high hardness. Some cations, particularly iron, if present in the emulsification water may cause a decrease in stability of the emulsion. Deionized or distilled water is preferred.

The oligomer, surfactant, and drier are mixed to form a homogeneous composition prior to adding the water. The oligomeric composition may be at room temperature or warmed slightly (70°–140° F.) before adding the water.

Water is added slowly under high shear agitation. Agitation is continued until an emulsion, usually milky in appearance, is formed. As here used, "high shear" means sufficient shear to form a stable emulsion from the materials at hand. The actual shear necessary to create such an emulsion will be dependent upon such variables as the nature and concentrations of the various components, the blade and container configurations, and similar such considerations familiar to those skilled in the art.

In one embodiment of the invention the emulsified coatings are cured primarily by actinic, e.g. ultraviolet (UV) or electron beam (EB), radiation. If UV radiation is used, then a photoinitiator is added. Preferably, the photoinitiator is water soluble or water compatible. Examples of such photoinitiators include 2-hydroxy-2-methyl-1-phenyl-propan-1-one, water soluble benzophenone derivatives, and 2,2-diethoxy acetophenone.

For a UV or EB cure, the water should be substantially removed from the deposited film before curing. On paper, wood and other porous surfaces, water is quickly absorbed into the hydrophilic substrate. For less absorbent substrates, water can be removed by surface evaporation at ambient temperature or more quickly by subjecting the film to infrared heat or warming it in a convection oven.

In another embodiment, the emulsified oligomers are combined with a polymerization initiator and an unsaturated monomer which serves as a polymerization initiator and crosslinker. Representative initiator-crosslinkers include polyallylic compounds such as polyester resins based on trimethylolpropane mono- or diallyl ethers and polyallylglycidyl ether alcohol resins. Those crosslinker-initiators that function both as latent initiators for low temperature free radical polymerization of the oligomers and, if present, monomers, and as a multifunctional crosslinker are the preferred crosslinker-initiators. The polyallylic ethers, such as Santolink TM XI-100 manufactured and sold by Monsanto Company, are representative of these preferred crosslinker-initiators. The initiator-crosslinker is usually present in the range of about 5 to about 25 percent by weight based on the total weight of organic components, preferably from about 10 to about 20 percent by weight.

Preferred polymerization initiators are those compatible with and stable in water. Examples of such initiators include cumene hydroperoxide, methyl ethyl ketone peroxide, 2,4-pentanedione peroxide, benzoyl peroxide, t-butyl peroxide, peroxyesters such as t-butylperbenzoate, 2,5-dimethylheyl-2,5-di(perbenzoate), dialkylperoxymonocarbonates and peroxy dicarbonate. The polymerization initiators are present in the range of about 0.1 to about 10 percent by weight of total organic components, preferably in the range of about 0.5 to about 2.0 percent by weight.

In another but less preferred embodiment of this invention, the emulsion can contain one or more α,β-ethylenically unsaturated monomer which crosslinks with the oligomers through thermally or ultraviolet light induced free radical polymerization. While the presence of such monomers is generally not preferred for the reasons described above, in some applications the presence of one or more such monomers is desirable. If present, the concentration of these monomers is usually less than about 30, preferably less than about 10, and more preferably less than about 5 weight percent based upon the total weight of the emulsion. Illustrative monomers include the mono-, di- and trifunctional acrylic and methacrylic esters, N-vinyl-2-pyrrolidone, N-methylacrylamide, the hydroxyalkyl esters of acrylic and methacrylic acid, and aromatic vinyl and divinyl compounds, e.g. styrene. If these monomers are present at all, then unsaturated monomers with relatively low volatility under process conditions, such as the polyfunctional acrylic and methacrylic esters, are preferred.

The following examples are illustrative of certain embodiments of this invention. Unless indicated to the contrary, all parts and percentages are by weight.

SPECIFIC EMBODIMENTS

EXAMPLE 1

Distilled water (288.6 g) is added under high speed agitation at a constant rate over 30 minutes to a mixture of dipentaerythritol monohydroxypentaacrylate (171 g), Chempol TM 19-4883 (a urethane acrylate oligomer manufactured by the Polymers Division of Cook Composites and Polymers (CCP), 171 g), P-CURE TM 29-4012 (an unsaturated polyester oligomer manufactured by CCP, 142 g), SAM 187 (a nonionic surfactant containing allyl unsaturation manufactured and sold by PPG Industries Inc., 43 g), BYK 341 (a silicone flow and leveling aid manufactured and sold by Byk Chemie, 2.3 g), and Nuocure CK (a 10 percent cobalt/potassium complex manufactured and sold by Hüls America, Inc., 2.9 g). The resulting emulsion is milky white, practically odorless, and has a viscosity of 940 centipoise (cps) at 25 C. This emulsion (100 g) is added to 4 g of 2-hydroxy-2-methyl-1-phenyl-propan-1-one (Darocure TM 1173 which is manufactured and sold by Ciba Geigy Corporation).

Approximately a 1 mil film of the initiated emulsion is applied by means of a wire wound rod onto a sheet of vinyl film. Within 5 minutes the coating turns from milky white to clear, and it is then exposed for 5 seconds to ultraviolet light produced by a 200 watt per inch mercury vapor lamp which was positioned approximately 6 inches from the film surface.

The resulting coating is tack free and fingernail mar free, has a greater than 90 gloss on a 60 degree Gardner meter, and is not removed by 100 double rubs with methyl ethyl ketone.

EXAMPLE 2

The UV coating composition of Example 1 is applied by brush onto a pine board and allowed to flash off for 5 minutes before exposing it to UV light. After 5 seconds of cure, the coating is tack and mar free, has very high gloss, and is unaffected by 200 double rubs with MEK.

EXAMPLE 3

Distilled water (211.2 g) is added gradually under high speed agitation (1500 rpm) to a mixture of hexafunctional urethane acrylate oligomer (a product of CCP designated B051-118, 200 g), P-CURE 29-4012 (200 g), SAM 187 (30 g), BYK 341 (1 g), and Nuocure CK (2 g). Mixing is continued until a uniform, milky white emulsion is formed. Santolink TM XI-100, a polyallylic ether manufactured and sold by Monsanto Company (20 g), and cumene hydroperoxide (1.5 g) are added to the emulsion.

The resulting peroxide-curable emulsified coating composition is applied as a 3 mil film to phosphatized steel panels and cured in an oven at 70 C. for 20 minutes. The resulting coating has a very high gloss (92 on a 60 degree Gardner meter), is tack and mar free, and gives a 5H pencil hardness.

EXAMPLE 4

Distilled water (212 g) is added under high speed agitation to a mixture of urethane triacrylate oligomer (a product of CCP designated XR-029-A985-69, 400 g), SAM 187 (30 g), BYK 341 (1 g), and Nuocure CK (2 g); and the mixing is continued until an emulsion is formed. Santolink XI-100 (11.7 g) and 2,4-pentanedione peroxide (0.75 g) are added with stirring to the emulsion (65 g).

The emulsified coating composition is applied as a 3 mil film by a draw down bar to a phosphatized steel panel. After curing for 30 minutes in an oven at 70 C., the film is clear, tack and mar free, and is unaffected by 100 double methyl ethyl ketone rubs.

EXAMPLE 5

Distilled water (281 g) is added under high speed agitation to a mixture of epoxy methacrylate oligomer (P-CURE 019-1606 which is a product of CCP, 486 g), SAM 187 (28 g), BYK 341 (2.2 g), and Nuocure CK (2.8 g), and the mixing is continued until an emulsion is formed. Santolink XI-100 (65 g) and 2,4-pentanedione peroxide (0.5 g) are then added to the emulsion (65 g).

A 3 mil coating of this composition on a phosphatized steel panel cures to a clear, nontacky film after 30 minutes in a 70 C. oven. The film resists 20 double rubs with methyl ethyl ketone, and it has an F pencil hardness.

EXAMPLE 6

Darocure TM 1173 (2 g) and N-methyldiethanolamine (1 g) are added to the emulsified oligomer of Example 5. A 1.5 mil film of this coating composition is applied by means of a wire wound rod to uncoated paper stock. After 10 minutes at room temperature, the milky white film turns clear. Exposure of the clear film for 0.8 seconds to a 150 watts per inch mercury vapor UV lamp positioned 6 inches from the film surface results in a tack and mar free film which is unaffected by 100 double methyl ethyl ketone rubs.

While this invention has been described in considerable detail by the preceding examples, this detail is provided for the purpose of illustration only and is not to be construed as a limitation upon the invention as described in the following claims.

What is claimed is:

1. An oligomeric emulsion curable by at least one of (i) exposure to actinic radiation, and (ii) by contact with a peroxide initiator, the emulsion comprising, based on the weight of the emulsion, between about:

A. 10 to about 60 wt % water;
   B. 0.5 to about 15 wt % of a reactive, nonionic surfactant represented by the following graphic formula:

$$R\text{---}O\text{---}(R'O)_m\text{---}(EO)_n\text{---}_1\text{---}CH_2CH_2\text{---}X$$

wherein
   R is an organic monovalent radical having $\alpha, \beta$-olefinic unsaturation;
   R'O is a bivalent alkylene-oxy group derived from a cyclic ether other than ethylene oxide or mixture of such cyclic ethers;
   E is a bivalent ethylene radical;
   X is selected from the group consisting of hydroxyl, chloride, sulfonate, sulfate, phosphate, diphosphate, acetate, isethionate, and the alkali metal salts of the aforedescribed sulfonate, sulfate, phosphate, acetate and isethionate anionic groups and tertiary amino; and
   m and n are each numbers which may vary from about 5 to about 100;
   C. 0.005 to about 0.08%, based on the wt of metal in the drier, of a metallic salt drier; and
   D. the balance of an $\alpha,\beta$-ethylenically unsaturated oligomer.

2. The emulsion of claim 1 in which the $\alpha,\beta$-ethylenically unsaturated oligomer is selected from the group consisting of unsaturated polyesters, urethane acrylates, urethane methacrylates, epoxy acrylates, epoxy methacrylates, polyester acrylates, polyester methacrylates, polyether acrylates and polyether methacrylates.

3. The emulsion of claim 2 in which the water is present in an amount not in excess of about 50 percent by weight.

4. The emulsion of claim 3 in which the metallic salt drier comprises a metal with a valence of at least 2 and an organic acid.

5. The emulsion of claim 4 in which the metal of the metallic salt drier is at least one of cobalt and manganese.

6. The emulsion of claim 5 in which the water is distilled or deionized water.

7. The emulsion of claim 1 which further comprises a photoinitiator.

8. The emulsion of claim 7 in which the photoinitiator is selected from the group consisting of 2-hydroxy-2-methyl-1-phenyl-propan-1-one, water-soluble benzophenone derivatives, and 2,2-diethoxy acetophenone.

9. The emulsion of claim 8 in which the photoinitiator is present in an amount between about 5 and about 25 percent based on the combined weight of the emulsion components other than water.

10. The emulsion of claim 1 further comprising a peroxide initiator.

11. The emulsion of claim 10 in which the peroxide initiator is selected from the group consisting of cumene hydroperoxide, methyl ethyl ketone peroxide, 2,4-pentanedione peroxide, benzoyl peroxide, t-butyl peroxide and peroxyesters.

12. The emulsion of claim 10 in which the peroxide initiator is present in an amount between about 0.1 and about 10 percent based on the combined weight of emulsion components other than water.

13. The emulsion of claim 1 further comprising an $\alpha,\beta$-ethylenically unsaturated monomer capable of crosslinking with the oligomer through free radical polymerization induced thermally or by actinic radiation.

14. The process of claim 13 in which the monomer selected from the group consisting of mono-, di- and trifunctional acrylic and methacrylic esters, N-vinyl-2-pyrrolidone, N-methylacrylamide, the hydroxyalkyl esters of acrylic and methacrylic acid, and an aromatic vinyl and divinyl compounds.

15. The emulsion of claims 14 in which the monomer is present in an amount between about 5 and about 30 weight percent based upon the total weight of the emulsion.

16. A coating prepared from the emulsion of claim 1.

* * * * *

UNITED STATES PATENT AND TRADEMARK OFFICE
CERTIFICATE OF CORRECTION

PATENT NO. : 5,369,139
DATED : November 29, 1994
INVENTOR(S) : Rudolph H. Boeckeler, et al.

It is certified that error appears in the above-indentified patent and that said Letters Patent is hereby corrected as shown below:

Graphic formula at column 3, line 10, should be stricken and replaced by the following correct formula:

$$\text{"R-O-(R'O)}_m\text{-(EO)}_{n-1}\text{-CH}_2\text{CH}_2\text{-X"}.$$

At column 3, lines 51-52, the term "napthenates" should be changed to "naphthenates".

At column 3, lines 54 and 55, the term "napthenate" should be changed to "naphthenate".

At column 5, line 47, the term "25" should be changed to "25°".

At column 6, lines 17, 34 and 48, the term "70" should be changed to "70°".

Column 7:

In claim 1, line 8, the graphic formula should be stricken and replaced with the following:

$$\text{"R-O-(R'O)}_m\text{-(EO)}_{n-1}\text{-CH}_2\text{CH}_2\text{-X"}.$$

UNITED STATES PATENT AND TRADEMARK OFFICE
CERTIFICATE OF CORRECTION

PATENT NO. : 5,369,139
DATED : November 29, 1994
INVENTOR(S) : Rudolph H. Boeckeler, et al.

It is certified that error appears in the above-indentified patent and that said Letters Patent is hereby corrected as shown below:

Column 8, line 32:

In claim 14, line 1, the term "process" should be changed to "emulsion".

Signed and Sealed this

Seventh Day of March, 1995

Attest:

BRUCE LEHMAN

Attesting Officer     Commissioner of Patents and Trademarks